United States Patent
Sun et al.

(10) Patent No.: US 12,384,953 B1
(45) Date of Patent: Aug. 12, 2025

(54) STRONGLY ADSORBED HYPER-BRANCHED FILTRATE REDUCER FOR WATER-BASED DRILLING FLUID WITH RESISTANCE TO 240° C. AND SATURATED SALINITY, PREPARATION METHOD THEREFOR AND USE THEREOF

(71) Applicant: China University of Petroleum (East China), Qingdao (CN)

(72) Inventors: Jinsheng Sun, Qingdao (CN); Jingping Liu, Qingdao (CN); Kaihe Lv, Qingdao (CN); Fengbao Liu, Qingdao (CN); Meichun Li, Qingdao (CN); Jiafeng Jin, Qingdao (CN); Jintang Wang, Qingdao (CN); Yuanwei Sun, Qingdao (CN); Taifeng Zhang, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/951,941

(22) Filed: Nov. 19, 2024

Related U.S. Application Data

(63) Continuation of application No. PCT/CN2024/108746, filed on Jul. 31, 2024.

(51) Int. Cl.
*C09K 8/508* (2006.01)
*C08F 290/06* (2006.01)
*C09K 8/24* (2006.01)

(52) U.S. Cl.
CPC ........ *C09K 8/5086* (2013.01); *C08F 290/062* (2013.01); *C09K 8/24* (2013.01)

(58) Field of Classification Search
CPC .... C08F 220/52; C08F 220/54; C08F 220/02; C08F 220/04; C08F 220/06; C08F 220/08; C08F 228/02; C09K 8/24
See application file for complete search history.

(56) References Cited

U.S. PATENT DOCUMENTS

| | | | |
|---|---|---|---|
| 6,784,267 B1 * | 8/2004 | Ward | C08G 83/006 526/307.7 |
| 2014/0378638 A1 * | 12/2014 | Wang | C08F 222/38 526/287 |
| 2019/0359751 A1 * | 11/2019 | Flore-Figueroa | C08F 220/286 |

FOREIGN PATENT DOCUMENTS

| | | | | |
|---|---|---|---|---|
| CN | 104940028 A | * | 9/2015 | |
| CN | 105037158 A | * | 11/2015 | ............. C07C 67/08 |
| CN | 105218757 A | | 1/2016 | |
| CN | 106366243 A | | 2/2017 | |
| CN | 108676129 A | | 10/2018 | |
| CN | 114716607 A | | 7/2022 | |
| CN | 114989351 A | | 9/2022 | |
| CN | 115322282 A | | 11/2022 | |
| CN | 115850578 A | | 3/2023 | |
| CN | 115947903 A | | 4/2023 | |
| CN | 117821037 A | | 4/2024 | |

OTHER PUBLICATIONS

CN-105037158-A, Machine translation, 2015 (Year: 2015).*
CN-104940028-A, Machine translation, 2015 (Year: 2015).*

* cited by examiner

*Primary Examiner* — Satya B Sastri
(74) *Attorney, Agent, or Firm* — Calfee, Halter & Griswold LLP

(57) ABSTRACT

The present disclosure relates to the technical field of well drilling, and discloses a strongly adsorbed hyper-branched filtrate reducer for water-based drilling fluid with resistance to 240° C. and saturated salinity, a preparation method therefor and use thereof. The filtrate reducer includes a first structural unit provided by an anionic hydration-enhancing monomer, a second structural unit provided by a cationic adsorption monomer, a third structural unit provided by a main chain monomer, a fourth structural unit provided by a cyclic monomer, a fifth structural unit provided by a polyether monomer, and a sixth structural unit provided by a hyper-branched structural monomer. The filtrate reducer of the present disclosure is capable of maintaining desirable rheology and filtrate reduction performance of the drilling fluid, and the long-term stability under the conditions of 240° C. and saturated salinity.

18 Claims, No Drawings

STRONGLY ADSORBED HYPER-BRANCHED FILTRATE REDUCER FOR WATER-BASED DRILLING FLUID WITH RESISTANCE TO 240° C. AND SATURATED SALINITY, PREPARATION METHOD THEREFOR AND USE THEREOF

CROSS-REFERENCE TO RELATED APPLICATIONS

The present application is a bypass continuation of International Application No. PCT/CN2024/108746 filed on Jul. 31, 2024, the contents of which are incorporated herein by reference.

FIELD

The present disclosure relates to the technical field of well drilling, in particular to a filtrate reducer and a preparation method therefor and use thereof, more particularly to a strongly adsorbed hyper-branched filtrate reducer for water-based drilling fluid with resistance to 240° C. and saturated salinity and a preparation method therefor and use thereof.

BACKGROUND

Drilling fluids are critical technologies essential for safeguarding the safe and efficient exploration and development of ultra-deep oil and gas reservoirs, the properties of drilling fluid determine the safety, efficiency, and success or failure of well drilling operations. However, ultra-deep drilling fluids face serious and unprecedented challenges: ultra-high temperature ($\geq 200°$ C.), ultra-high pressure ($\geq 140$ MPa), ultra-high salinity ($\geq 200,000$ mg/L), and ultra-high stress ($\geq 160$ MPa). The challenges result in the uncontrollable stability of the drilling fluid properties and are apt to cause accidents such as well collapse, lost circulation, and blowout. The costs of ultra-deep wells are generally high, in the event of an accident, which will result in an enormous economic loss, or even evolve into a catastrophic event of "destruction of well and casualties of staff". The most critical factor to the stability of drilling fluids is the filtrate reducer, but there is no filtrate reducer for the drilling fluid with resistance to ultra-high temperature, ultra-high pressure, and saturated salinity (36% NaCl), in particular, there is no the filtrate reducer for drilling fluid with resistance to 240° C. and saturated salinity. Therefore, it is urgent to develop a filtrate reducer for drilling fluid with resistance to ultra-high temperature, ultra-high pressure, and saturated salinity.

Patent application CN115850578A discloses a polymer filtrate reducer, which has a temperature resistance up to 240° C., but it only has a salinity resistance of 4%, and cannot maintain desirable performance under the saturated salinity conditions. Patent application CN114989351A discloses a low-molecular-weight filtrate reducer, which has a resistance to saturated salinity, but the ester monomers in the filtrate reducer are prone to degrade at a high temperature, and the temperature resistance of the polymer is only 200° C. Patent applications CN114716607A and CN106366243A both disclose a novel zwitterionic copolymer filtrate reducer, wherein a cationic group can enhance the adsorption capacity of the polymer at high temperature, and the strong hydration group may improve the salt resistance of the polymer, however, the resistance to cations $K^+$ and $Ca^{2+}$ do not meet the requirements of deep stratum, and the high-temperature and high-pressure filtrate loss performance is poor.

SUMMARY

The present disclosure aims to overcome the defects in the prior art that the water-based drilling fluid filtrate reducer cannot simultaneously resist ultra-high temperature, ultra-high pressure, and saturated salinity and provides a strongly adsorbed hyper-branched filtrate reducer for water-based drilling fluid with resistance to 240° C. and saturated salinity, a preparation method therefor and use thereof. The filtrate reducer provided by the present disclosure is capable of maintaining good performance under the conditions of 240° C. and saturated salinity and is stable for a long time (greater than 10 days), thus the filtrate reducer can provide technical support for ultra-deep oil and gas drilling.

To fulfill the above purpose, the first aspect of the present disclosure provides a filtrate reducer comprising:

a first structural unit provided by an anionic hydration-enhancing monomer;

a second structural unit provided by a cationic adsorption monomer;

a third structural unit provided by a main chain monomer;

a fourth structural unit provided by a cyclic monomer;

a fifth structural unit provided by a polyether monomer;

a sixth structural unit provided by a hyper-branched structural monomer;

Wherein the main chain monomer is N,N-dimethyl acrylamide and/or N,N-diethyl acrylamide, the filtrate reducer has a weight average molecular weight within the range from 200,000 to 800,000.

Preferably, the weight ratio of the first structural unit, the second structural unit, the third structural unit, the fourth structural unit, the fifth structural unit, and the sixth structural unit is (10-60):(5-40):(5-40):(2-20):(5-40): 1, preferably (20-30):(10-20):(10-20):(5-10):(10-20):1.

Preferably, the anionic hydration-enhancing monomer is at least one of 2-acrylamido-2-methylpropane sulfonic acid, sodium p-styrene sulfonate, sodium allyl sulfonate, and sodium methacrylate sulfonate.

Preferably, the cationic adsorption monomer is at least one of dimethyl aminopropyl methacrylamide, dimethyldiallyl ammonium chloride, and acryloxyethyl trimethyl ammonium chloride.

Preferably, the main chain monomer is a combination of N,N-dimethyl acrylamide and N,N-diethyl acrylamide, and the weight ratio of N,N-dimethyl acrylamide to N,N-diethyl acrylamide is 1:(0.1-1), preferably 1:(0.3-0.5).

Preferably, the cyclic monomer is at least one of N-vinyl pyrrolidone, 1-vinylimidazole, 4-vinylpyridine, and 4-acryloyl morpholine.

Preferably, the polyether monomer is at least one of modified alkylene polyoxyethylene ether, hydroxybutyl polyoxyethylene ether, 4-hydroxybutyl vinyl ether polyoxyethylene ether, and ethylene glycol monovinyl polyoxyethylene ether.

Preferably, the polyether monomer has a molecular weight within the range from 1,500 to 4,000.

Preferably, the structural formula of the hyper-branched structural monomer is represented by formula (I),

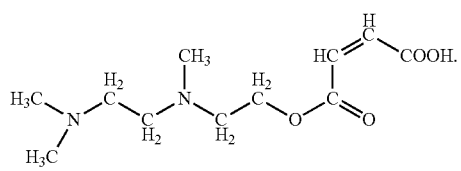

formula (I)

The second aspect of the present disclosure provides a preparation method for a filtration reducer, the method comprises the following steps:

Subjecting anionic hydration-enhancing monomer, cationic adsorption monomer, main chain monomer, cyclic monomer, and polyether monomer to a primary reaction in the presence of a first initiator under an inert atmosphere;

Subjecting the product obtained from the primary reaction to a secondary reaction with hyper-branched structural monomer in the presence of a second initiator;

Wherein the main chain monomer is N,N-dimethyl acrylamide and/or N,N-diethyl acrylamide.

Preferably, the dosage weight ratio of the anionic hydration-enhancing monomer, the cationic adsorption monomer, the main chain monomer, the cyclic monomer, the polyether monomer, and the hyper-branched structural monomer is (10-60):(5-40):(5-40):(2-20):(5-40): 1, preferably (20-30):(10-20):(10-20):(5-10):(10-20): 1.

Preferably, the anionic hydration-enhancing monomer is at least one of 2-acrylamido-2-methylpropane sulfonic acid, sodium p-styrene sulfonate, sodium allyl sulfonate, and sodium methacrylate sulfonate.

Preferably, the cationic adsorption monomer is at least one of dimethyl aminopropyl methacrylamide, dimethyldiallyl ammonium chloride, and acryloxyethyl trimethyl ammonium chloride.

Preferably, the main chain monomer is a combination of N,N-dimethyl acrylamide and N,N-diethyl acrylamide, and the weight ratio of N,N-dimethyl acrylamide to N,N-diethyl acrylamide is 1:(0.1-1), preferably 1:(0.3-0.5).

Preferably, the cyclic monomer is at least one of N-vinyl pyrrolidone, 1-vinylimidazole, 4-vinylpyridine, and 4-acryloyl morpholine.

Preferably, the polyether monomer is at least one of the modified alkylene polyoxyethylene ether, hydroxybutyl polyoxyethylene ether, 4-hydroxybutyl vinyl ether polyoxyethylene ether, and ethylene glycol monovinyl polyoxyethylene ether.

Preferably, the polyether monomer has a molecular weight within the range from 1,500 to 4,000.

Preferably, the structural formula of the hyper-branched structural monomer is represented by formula (I),

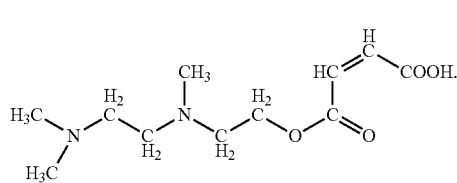

formula (I)

Preferably, the first initiator is a combination of a persulfate salt and a reducing agent, and the weight ratio of said persulfate salt to said reducing agent is 1:(0.1-0.5).

Preferably, the persulfate salt is at least one of ammonium persulfate, potassium persulfate, and sodium persulfate.

Preferably, the reducing agent is at least one of sodium bisulfite, ammonium bisulfite, and potassium bisulfite.

Preferably, the second initiator is a combination of azobisisobutyramidine hydrochloride and a reducing agent, and the weight ratio of said azobisisobutyramidine hydrochloride to said reducing agent is 1:(0.1-0.5).

Preferably, the reducing agent is at least one of sodium bisulfite, ammonium bisulfite, and potassium bisulfite.

Preferably, the temperature of said secondary reaction is 5-25° C. higher than the temperature of said primary reaction.

Preferably, the temperature of said primary reaction is within the range of 65-75° C., and the temperature of said secondary reaction is within the range of 80-90° C.

The third aspect of the present disclosure provides a drilling fluid comprising the aforementioned filtrate reducer.

The filtrate reducer according to the present disclosure is obtained by copolymerizing anionic hydration-enhancing monomer, cationic adsorption monomer, main chain monomer, cyclic monomer, polyether monomer, and hyper-branched structural monomer, when the filtrate reducer is used in water-based drilling fluids, it is capable of maintaining desirable rheology and filtrate reduction performance of the drilling fluid, and the long-term stability under the conditions of 240° C. and saturated salinity. The cationic structure can strongly adsorb to the clay surface with negative charge, the anionic structure can strongly adsorb to the clay surface with positive charge, and do not easily desorb at ultra-high temperatures; the hyper-branched structural monomer causes the polymer to form a three-dimensional broom-like hyper-branched polymer; the polyether monomer can form multiple C—O chemical bonds by reacting its alkyl ether structure with the hydroxyl group on clay surface, the multiple C—O chemical bonds have a more stable adsorption than other chemical bonds, hydrogen bonds, electrostatic interaction and the like, the unique three-dimensional broom-like hyper-branched structural molecular chains have stronger adsorptive power than the molecular chains of other micro-cross-linked structures and hydrophobic-associated structures, and have higher rigidity and larger steric hindrance, it ensures that the polymer has a structural stability for a long time under the ultra-high temperature condition and effectively resists strong double electrode layer compression of the molecular chain by the high-valence salt ions, such that the polymer can efficiently maintain the spatial extension state of molecular chains under the conditions of ultra-high temperature and saturated salinity, thereby providing a thicker hydrated film, which has stable properties under the conditions of ultra-high temperature and saturated salinity, and can effectively reduce the filtration loss.

The ten-kilometer deep stratum environment with ultra-high temperature and saturated salinity presents a huge challenge to the filtrate reducer of drilling fluids along with the exploration and development process of deep wells with a depth of ten kilometers. The use of the filtrate reducer of the present disclosure can directly meet the practical engineering demands of deep wells with a depth of ten kilometers, exhibits superior filtrate reduction performance under ultra-high temperature and high mineralization conditions of 240° C. and saturated salinity, and maintains the long-term stability, the filtrate reducer provides efficient technical support for drilling deep wells with a depth of ten kilometers, and fills the gap of the filtrate reducer product with resistance to 240° C. and saturated salinity. In addition, the filtrate reducer of the present disclosure is desirably compatible with other oilfield chemical treating agents and can be used as a viscosifier in fracturing fluids and a fluid loss additive in cementing fluids.

DETAILED DESCRIPTION

The specific embodiments of the present disclosure will be described in detail below. It should be understood that the embodiments described herein are merely illustrative and explanatory of the present disclosure, instead of imposing limitations thereto.

The filtrate reducer according to the present disclosure comprises a first structural unit provided by an anionic hydration-enhancing monomer, a second structural unit provided by a cationic adsorption monomer, a third structural unit provided by a main chain monomer, a fourth structural unit provided by a cyclic monomer, a fifth structural unit provided by a polyether monomer, and a sixth structural unit provided by a hyper-branched structural monomer. The filtrate reducer according to the present disclosure is capable of maintaining desirable rheology and filtrate reduction performance of the drilling fluid, and the long-term stability under the conditions of 240° C. and saturated salinity, when the filtrate reducer is used in a water-based drilling fluid, due to the synergistic effect of the six kinds of structural units.

In the filtrate reducer according to the present disclosure, the weight ratio of the first structural unit, the second structural unit, the third structural unit, the fourth structural unit, the fifth structural unit, and the sixth structural unit may be (10-60):(5-40):(5-40):(2-20):(5-40): 1, preferably (12-55):(6-35):(6-35):(3-18):(6-35): 1, more preferably (15-50):(7-30):(7-30):(4-15):(7-30): 1, further preferably (18-40):(8-25):(8-25):(5-12):(8-25): 1, still further preferably (20-30):(10-20):(10-20):(5-10):(10-20): 1. When the weight ratio of the six kinds of structural units in the filtrate reducer falls into the above-mentioned ranges (particularly the preferred ranges), the filtrate reducer has better filtrate reduction performance.

In the present disclosure, the filtrate reducer has a weight average molecular weight within the range from 200,000 to 800,000, preferably within the range from 300,000 to 700,000, more preferably within the range from 350,000 to 650,000. In the present disclosure, the weight average molecular weight of the filtrate reducer is obtained by gel permeation chromatography (GPC) detection.

In the present disclosure, the main chain monomer is N,N-dimethyl acrylamide and/or N,N-diethyl acrylamide. In a case of preferably, the main chain monomer is N,N-dimethyl acrylamide and N,N-diethyl acrylamide, and the weight ratio of N,N-dimethyl acrylamide to N,N-diethyl acrylamide is 1:(0.1-1), further preferably 1:(0.2-0.8), more preferably 1:(0.3-0.7), and still more preferably 1:(0.3-0.5). In the case of preferably, the filtrate reducer has better filtrate reduction performance.

In the present disclosure, the anionic hydration-enhancing monomer is preferably at least one of 2-acrylamido-2-methylpropane sulfonic acid, sodium p-styrene sulfonate, sodium allyl sulfonate, and sodium methacrylate sulfonate. When the anionic hydration-enhancing monomer is selected from the above-preferred monomer examples, the filtrate reducer has better filtrate reduction performance.

In the present disclosure, the cationic adsorption monomer is preferably at least one of dimethyl aminopropyl methacrylamide, dimethyldiallyl ammonium chloride, and acryloxyethyl trimethyl ammonium chloride. When the cationic adsorption monomer is selected from the above-preferred monomer examples, the filtrate reducer has better filtrate reduction performance.

In the present disclosure, the cyclic monomer is preferably at least one of N-vinyl pyrrolidone, 1-vinylimidazole, 4-vinylpyridine, and 4-acryloyl morpholine. When the cyclic monomer is selected from the above-mentioned preferred monomer examples, the filtrate reducer has better filtrate reduction performance.

In the present disclosure, the polyether monomer is preferably at least one of the modified alkylene polyoxyethylene ether, hydroxybutyl polyoxyethylene ether, 4-hydroxybutyl vinyl ether polyoxyethylene ether, and ethylene glycol monovinyl polyoxyethylene ether. When the polyether monomer is selected from the above-mentioned preferred monomer examples, the filtrate reducer has better filtrate reduction performance. The molecular weight of the polyether monomer may be within the range from 1,000 to 10,000, preferably within the range from 1,500 to 6,000, more preferably within the range from 1,500 to 4,000, and further preferably within the range from 1,800 to 3,000.

In the present disclosure, in a case of preferably, the structural formula of the hyper-branched structural monomer is represented by formula (I),

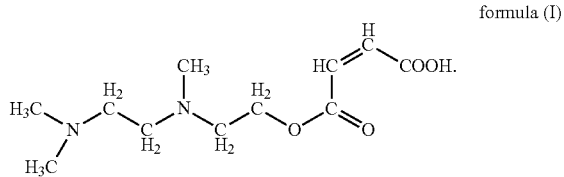

formula (I)

The filtrate reducer has significantly better filtrate reduction performance when the hyper-branched structural monomer is selected from the monomers represented by the above formula (I).

In some embodiments, the monomers forming the filtrate reducer comprise 2-acrylamido-2-methylpropane sulfonic acid, dimethyl aminopropyl methacrylamide, main chain monomer, modified alkylene polyoxyethylene ether, 1-vinylimidazole, and a monomer represented by formula (I), wherein the main chain monomer is a combination of N,N-dimethyl acrylamide and N,N-diethyl acrylamide, and the weight ratio of N,N-dimethyl acrylamide and N,N-diethyl acrylamide 1:(0.3-0.5). The filtrate reducer formed according to the embodiment has significantly higher filtrate reduction performance.

In other embodiments, the monomers forming the filtrate reducer comprise sodium p-styrene sulfonate, dimethyldiallyl ammonium chloride, main chain monomer, hydroxybutoxyether, 4-acryloyl morpholine, and a monomer represented by formula (I), wherein the main chain monomer is a combination of N,N-dimethyl acrylamide and N,N-diethyl acrylamide, and the weight ratio of N,N-dimethyl acrylamide and N,N-diethyl acrylamide 1:(0.3-0.5). The filtrate reducer formed according to the embodiment has significantly higher filtrate reduction performance.

In some other embodiments, the monomers forming the filtrate reducer comprise sodium allyl sulfonate, acryloxyethyl trimethyl ammonium chloride, main chain monomer, 4-hydroxybutyl vinyl ether polyoxyethylene ether, N-vinyl pyrrolidone and a monomer represented by formula (I), wherein the main chain monomer is a combination of N,N-dimethyl acrylamide and N,N-diethyl acrylamide, and the weight ratio of N,N-dimethyl acrylamide and N,N- diethyl acrylamide 1:(0.3-0.5). The filtrate reducer formed according to the embodiment has significantly higher filtrate reduction performance.

In some other embodiments, the monomers forming the filtrate reducer comprise sodium methacrylate sulfonate, dimethyldiallyl ammonium chloride, main chain monomer, ethylene glycol monovinyl polyoxyethylene ether, 4-vinyl pyridine, and a monomer represented by formula (I), wherein the main chain monomer is a combination of N,N-dimethyl acrylamide and N,N-diethyl acrylamide, and the weight ratio of N,N-dimethyl acrylamide and N,N-diethyl acrylamide 1:(0.3-0.5). The filtrate reducer formed according to the embodiment has significantly higher filtrate reduction performance.

The filtrate reducer of the present disclosure may be prepared according to conventional polymerization methods. In some embodiments, the preparation method of the filtrate reducer comprises the following steps:

Subjecting anionic hydration-enhancing monomer, cationic adsorption monomer, main chain monomer, cyclic monomer, and polyether monomer to a primary reaction in the presence of a first initiator under an inert atmosphere;

Subjecting the product obtained from the primary reaction to a secondary reaction with hyper-branched structural monomer in the presence of a second initiator.

In the method of the present disclosure, the dosage weight ratio of the anionic hydration-enhancing monomer, the cationic adsorption monomer, the main chain monomer, the cyclic monomer, the polyether monomer, and the hyper-branched structural monomer may be (10-60):(5-40):(5-40):(2-20):(5-40): 1, preferably (12-55):(6-35):(6-35):(3-18):(6-35): 1, more preferably (15-50):(7-30):(7-30):(4-15):(7-30): 1, further preferably (18-40):(8-25):(8-12):(8-25): 1, even further preferably (20-30):(10-20):(10-20):(5-10):(10-20): 1. The filtrate reducer prepared according to the above ratio ranges (particularly the preferred ratio ranges) has better filtrate reduction performance.

In the method of the present disclosure, the conditions of the primary reaction and the secondary reaction are such that the weight average molecular weight of the prepared filtrate reducer is within the range from 200,000 to 800,000, preferably within the range from 300,000 to 700,000, more preferably within the range from 350,000 to 650,000.

In a case of preferably, the temperature of said secondary reaction is 5-25° C., preferably 8-20° C., more preferably 10-18° C., higher than the temperature of said primary reaction. Still more preferably, the temperature of said primary reaction is within the range of 65-75° C., and the temperature of said secondary reaction is within the range of 80-90° C.

In the method of the present disclosure, it is preferable that the duration of the primary reaction is 4-6h, and the duration of the secondary reaction is 2-4h.

In the method of the present disclosure, the main chain monomer is N,N-dimethyl acrylamide and/or N,N-diethyl acrylamide. In a case of preferably, the main chain monomer is a combination of N,N-dimethyl acrylamide and N,N-diethyl acrylamide, and the weight ratio of N,N-dimethyl acrylamide to N,N-diethyl acrylamide is 1:(0.1-1), further preferably 1:(0.2-0.8), more preferably 1:(0.3-0.7), further more preferably 1:(0.3-0.5). In the above-preferred case, the prepared filtrate reducer has better filtrate reduction performance.

In the method of the present disclosure, in a case of preferably, the anionic hydration-enhancing monomer is at least one of 2-acrylamido-2-methylpropane sulfonic acid, sodium p-styrene sulfonate, sodium allyl sulfonate, and sodium methacrylate sulfonate. When the anionic hydration-enhancing monomer is selected from the preferred monomer examples, the prepared filtrate reducer exhibits better filtrate reduction performance.

In the method of the present disclosure, in a case of preferably, the cationic adsorption monomer is at least one of dimethyl aminopropyl methacrylamide, dimethyldiallyl ammonium chloride, and acryloxyethyl trimethyl ammonium chloride. When the cationic adsorption monomer is selected from the preferred monomer examples, the prepared filtrate reducer exhibits better filtrate reduction performance.

In the method of the present disclosure, in a case of preferably, the cyclic monomer is at least one of N-vinyl pyrrolidone, 1-vinylimidazole, 4-vinylpyridine, and 4-acryloyl morpholine. When the cyclic monomer is selected from the preferred monomer examples, the prepared filtrate reducer exhibits better filtrate reduction performance.

In the method of the present disclosure, in a case of preferably, the polyether monomer is at least one of modified alkylene polyoxyethylene ether, hydroxybutyl polyoxyethylene ether, 4-hydroxybutyl vinyl ether polyoxyethylene ether, and ethylene glycol monovinyl polyoxyethylene ether. When the polyether monomer is selected from the preferred monomer examples, the prepared filtrate reducer exhibits better filtrate reduction performance. The molecular weight of the polyether monomer may be within the range from 1,000 to 10,000, preferably within the range from 1,500 to 6,000, more preferably within the range from 1,500 to 4,000, and even more preferably within the range from 1,800 to 3,000.

In the present disclosure, the structural formula of the hyper-branched structural monomer is preferably represented by formula (I),

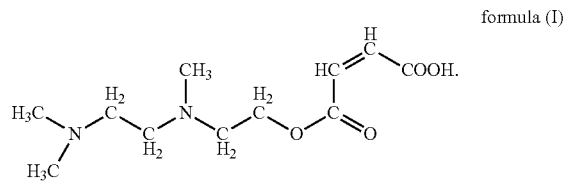 [SMILES: CN(C)CCN(C)CCOC(=O)/C=C\C(=O)O]

formula (I)

When the hyper-branched structural monomer is selected from the monomers represented by the above formula (I), the prepared filtrate reducer exhibits better filtrate reduction performance.

In the present disclosure, the hyper-branched structural monomer represented by formula (I) can be obtained through the esterification reaction of N-methyl-N-(N,N-dimethylaminoethyl) ethanolamine and maleic anhydride, the reaction formula is as shown below.

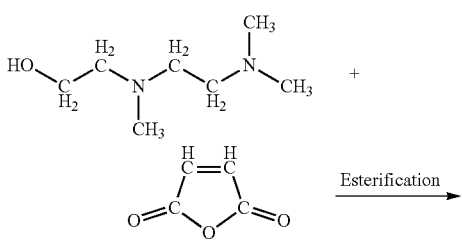

-continued

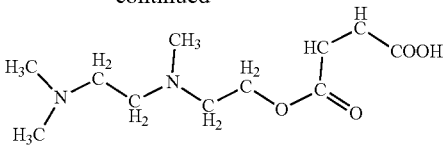

In some embodiments, the monomers for preparing the filtrate reducer comprise 2-acrylamido-2-methylpropane sulfonic acid, dimethyl aminopropyl methacrylamide, main chain monomer, modified alkylene polyoxyethylene ether, 1-vinylimidazole, and a monomer represented by formula (I), wherein the main chain monomer is a combination of N,N-dimethyl acrylamide and N,N-diethyl acrylamide, and the weight ratio of N,N-dimethyl acrylamide and N,N-diethyl acrylamide 1:(0.3-0.5). The filtrate reducer formed according to the embodiment has significantly higher filtrate reduction performance.

In other embodiments, the monomers for preparing the filtrate reducer comprise sodium p-styrene sulfonate, dimethyldiallyl ammonium chloride, main chain monomer, hydroxybutoxyether, 4-acryloyl morpholine, and a monomer represented by formula (I), wherein the main chain monomer is a combination of N,N-dimethyl acrylamide and N,N-diethyl acrylamide, and the weight ratio of N,N-dimethyl acrylamide and N,N-diethyl acrylamide 1:(0.3-0.5). The filtrate reducer formed according to the embodiment has significantly higher filtrate reduction performance.

In some other embodiments, the monomers for preparing the filtrate reducer comprise sodium allyl sulfonate, acryloxyethyl trimethyl ammonium chloride, main chain monomer, 4-hydroxybutyl vinyl ether polyoxyethylene ether, N-vinyl pyrrolidone and a monomer represented by formula (I), wherein the main chain monomer is a combination of N,N-dimethyl acrylamide and N,N-diethyl acrylamide, and the weight ratio of N,N-dimethyl acrylamide and N,N-diethyl acrylamide 1:(0.3-0.5). The filtrate reducer formed according to the embodiment has significantly higher filtrate reduction performance.

In some other embodiments, the monomers for preparing the filtrate reducer comprise sodium methacrylate sulfonate, dimethyldiallyl ammonium chloride, main chain monomer, ethylene glycol monovinyl polyoxyethylene ether, 4-vinyl pyridine, and a monomer represented by formula (I), wherein the main chain monomer is a combination of N,N-dimethyl acrylamide and N,N-diethyl acrylamide, and the weight ratio of N,N-dimethyl acrylamide and N,N-diethyl acrylamide 1:(0.3-0.5). The filtrate reducer formed according to the embodiment has significantly higher filtrate reduction performance.

In the method of the present disclosure, the primary reaction is performed in the presence of a first initiator, which is preferably a combination of a persulfate salt and a reducing agent. More preferably, in the first initiator, the weight ratio of the persulfate salt to the reducing agent is 1:(0.1-0.5), preferably 1:(0.2-0.4), and further preferably 1:(0.2-0.3). Wherein the persulfate salt may be at least one of ammonium persulfate, potassium persulfate, and sodium persulfate. The reducing agent may be at least one of sodium bisulfite, ammonium bisulfite, and potassium bisulfite.

In the method of the present disclosure, the secondary reaction is performed in the presence of a second initiator, which is preferably a combination of azobisisobutyramidine hydrochloride and a reducing agent. More preferably, the weight ratio of said azobisisobutyramidine hydrochloride to said reducing agent is 1:(0.1-0.5), preferably 1:(0.2-0.4), and more preferably 1:(0.2-0.3). Wherein the reducing agent is at least one of sodium bisulfite, ammonium bisulfite, and potassium bisulfite.

In a more preferred embodiment, a preparation method of the filtration reducer comprises the following steps:

(1) Dispersing the anionic hydration-enhancing monomer in water, if the solution is acidic, adjusting the pH to 5-7 by using an alkaline solution (e.g., a NaOH solution);

(2) Adding main chain monomer, cationic adsorption monomer, polyether monomer, and cyclic monomer sequentially, stirring and mixing the monomers, then raising the temperature to 65-75° C., introducing nitrogen gas (or inert gas) for 10-30 min, then adding a first initiator, and carrying out a constant temperature reaction for 4-6h;

(3) Further raising the temperature to 80-90° C., adding a hyper-branched structural monomer and a second initiator, and continuing the reaction for 2-4h;

(4) After the reaction is finished, washing the reaction product with acetone 3-5 times, drying the reaction product at 80-100° C. for 8-12h, then pulverizing it to obtain a white or yellowish powder, which is exactly the filtrate reducer suitable for use as a water-based drilling fluid filtrate reducer according to the present disclosure.

In the method of the present disclosure, the dosage weight ratio of water to the hyper-branched structural monomer may be (60-400): 1, preferably (80-200): 1.

In the method of the present disclosure, the dosage weight ratio of the first initiator to the hyper-branched structural monomer may be (0.05-0.6): 1, preferably (0.1-0.5): 1.

In the method of the present disclosure, the dosage weight ratio of the second initiator to the hyper-branched structural monomer may be (0.025-0.2): 1, preferably (0.05-0.1): 1.

The drilling fluid of the present disclosure contains a filtrate reducer, wherein the filtrate reducer is provided by the present disclosure. The drilling fluid according to the present disclosure is capable of maintaining desirable rheology and filtrate reduction performance of the drilling fluid, and the long-term stability under the conditions of ultra-high temperature (e.g., 240° C.) and saturated salinity.

The strongly adsorbed hyper-branched filtrate reducer for water-based drilling fluid with resistance to 240° C. and saturated salinity, a preparation method therefor and use thereof in the present disclosure will be further described below with reference to examples. The examples, which are implemented under the premise of the technical scheme of the present disclosure, provide detailed embodiments and specific operational processes, but the protection scope of the present disclosure is not limited to the examples described below.

Unless otherwise specified, the experimental methods in the following examples are conventional in the field. Unless otherwise specified, the experimental materials used in the following examples are commercially available.

The compounds 2-acrylamido-2-methylpropane sulfonic acid, sodium p-styrene sulfonate, sodium allyl sulfonate, sodium methacrylate sulfonate, dimethyl aminopropyl methacrylamide, dimethyldiallyl ammonium chloride, acryloxyethyl trimethyl ammonium chloride, N,N-dimethyl acrylamide, N,N-diethyl acrylamide, N-vinyl pyrrolidone, 1-vinylimidazole, 4-vinylpyridine, 4-acryloyl morpholine, N-methyl-N-(N,N-dimethylaminoethyl) ethanolamine, maleic anhydride, N,N,N',N'-tetramethyl ethylenediamine, ammonium persulfate, potassium persulfate, azobisisobutyramide hydrochloride, and sodium bisulfite used in the following examples and comparative examples were commercially available from Shanghai Macklin Biochemical Technology Co., Ltd.

The hyper-branched structural monomer TME was prepared through the esterification reaction of the analytical pure N-methyl-N-(N,N-dimethylamidoethyl) ethanolamine and maleic anhydride.

Modified alkylene polyoxyethylene ether (PCB7230-1800), hydroxybutyl polyoxyethylene ether (PSV7630-2000), 4-hydroxybutyl vinyl ether polyoxyethylene ether (VPEG-1800), and ethylene glycol monovinyl polyoxyethylene ether (EPEG-2000) were purchased from Wuhan Shanjiang Chemical Technology Co., Ltd. The number after the symbol "-" represented the molecular weight.

The sodium bentonite was purchased from Shandong Huawei bentonite Co. Ltd.

The filtrate reducer DSP-1, sulfonated asphalt FF-1, amino polyol AP-1, sulfomethyl phenol resin SMP-2, sulfonated lignite SMC, sulfonated lignite phenol resin SPNH, lubricant RH-3, and plugging agent NP-1 were all purchased from Shandong Deshunyuan Petroleum Science & Technology Co., Ltd.

The high temperature-resistant cementing water loss-reducing agent HT-1 was purchased from Chengdu Chuanfeng Chemical Engineering Co., Ltd.

In the examples, the weight average molecular weight of the filtrate reducer was obtained by gel permeation chromatography detection.

Example 1

The main chain monomer used in the example was obtained by mixing N,N-dimethyl acrylamide and N,N-diethyl acrylamide in a mass ratio of 1:0.4.
(1) 20 g of 2-acrylamido-2-methylpropanesulfonic acid was added into 130 g of water, stirred till it was adequately dispersed, and the pH was adjusted to 6 by using a NaOH solution having a concentration of 50 wt %;
(2) 10 g of main chain monomer, 15 g of dimethyl aminopropyl methacrylamide, 15 g of polyether monomer PCB 7230-1800, and 8 g of 1-vinylimidazole were added successively, the materials were stirred until they were sufficiently dispersed, the liquid was transferred to a three-neck flask;
(3) The temperature was raised to 65° C., nitrogen gas was introduced for 20 min, 0.25 g of ammonium persulfate and 0.05 g of sodium bisulfite were subsequently added to trigger the reaction, the constant temperature reaction with introduced nitrogen gas was performed for 5h;
(4) The temperature was further raised to 85° C., and the flask was connected with a condenser tube, 0.8 g of hyper-branched structural monomer TME, 0.05 g of azobisisobutyramide hydrochloride, and 0.02 g of sodium bisulfite were added, the reaction was continued for 3h;
(5) After the reaction was terminated, the reaction product was washed with acetone 3 times, subjected to drying in an oven at 90° C. for 10h, and then pulverized, the obtained yellowish powder was exactly the filtrate reducer A1 of the present disclosure, which had a weight average molecular weight of 490,000.

Example 2

The main chain monomer used in the example was obtained by mixing N,N-dimethyl acrylamide and N,N-diethyl acrylamide in a mass ratio of 1:0.3.
(1) 30 g of sodium p-styrene sulfonate was added into 180 g of water, and stirred till it was adequately dispersed;
(2) 15 g of main chain monomer, 20 g of dimethyldiallyl ammonium chloride, 20 g of polyether monomer PSV 7630-2000, and 9 g of 4-acryloyl morpholine were added successively, the materials were stirred until they were sufficiently dispersed, the liquid was transferred to a three-neck flask;
(3) The temperature was raised to 70° C., nitrogen gas was introduced for 20 min, 0.3 g of potassium persulfate and 0.1 g of sodium bisulfite were subsequently added to trigger the reaction, and the constant temperature reaction with introduced nitrogen gas was performed for 6h;
(4) The temperature was further raised to 90° C., and the flask was connected with a condenser tube, 1 g of hyper-branched structural monomer TME, 0.06 g of azobisisobutyramide hydrochloride, and 0.02 g of sodium bisulfite were added, the reaction was continued for 4h;
(5) After the reaction was terminated, the reaction product was washed with acetone 3 times, subjected to drying in an oven at 90° C. for 10h, and then pulverized, the obtained white powder was exactly the filtrate reducer A2 of the present disclosure, which had a weight average molecular weight of 410,000.

Example 3

The main chain monomer used in the example was obtained by mixing N,N-dimethyl acrylamide and N,N-diethyl acrylamide in a mass ratio of 1:0.4.
(1) 30 g of sodium allyl sulfonate was added into 160 g of water, and stirred till it was adequately dispersed;
(2) 20 g of main chain monomer, 10 g of acryloyloxyethyl trimethyl ammonium chloride, 15 g of polyether monomer VPEG-1800, and 6 g of N-vinyl pyrrolidone were added successively, the materials were stirred until they were sufficiently dispersed, the liquid was transferred to a three-neck flask;
(3) The temperature was raised to 70° C., nitrogen gas was introduced for 20 min, 0.25 g of potassium persulfate and 0.15 g of sodium bisulfite were subsequently added to trigger the reaction, and the constant temperature reaction with introduced nitrogen gas was performed for 5h;
(4) The temperature was further raised to 80° C., and the flask was connected with a condenser tube, 2 g of hyper-branched structural monomer TME, 0.08 g of azobisisobutyramide hydrochloride, and 0.02 g of sodium bisulfite were added, the reaction was continued for 2h;
(5) After the reaction was terminated, the reaction product was washed with acetone 3 times, subjected to drying in an oven at 90° C. for 10h, and then pulverized, the obtained white powder was exactly the filtrate reducer A3 of the present disclosure, which had a weight average molecular weight of 580,000.

Example 4

The main chain monomer used in the example was obtained by mixing N,N-dimethyl acrylamide and N,N-diethyl acrylamide in a mass ratio of 1:0.5.

(1) 25 g of sodium methacrylate was added into 190 g of water, stirred till it was adequately dispersed;
(2) 10 g of main chain monomer, 10 g of dimethyldiallyl ammonium chloride, 10 g of dimethyl aminopropyl methacrylamide, 20 g of polyether monomer EPEG-2000, and 8 g of 4-vinylpyridine were added successively, the materials were stirred until they were sufficiently dispersed, the liquid was transferred to a three-neck flask;
(3) The temperature was raised to 75° C., nitrogen gas was introduced for 20 min, 0.35 g of potassium persulfate and 0.15 g of sodium bisulfite were subsequently added to trigger the reaction, and the constant temperature reaction with introduced nitrogen gas was performed for 6h;
(4) The temperature was further raised to 85° C., and the flask was connected with a condenser tube, 1 g of hyper-branched structural monomer TME, 0.04 g of azobisisobutyramide hydrochloride, and 0.01 g of sodium bisulfite were added, the reaction was continued for 2h;
(5) After the reaction was terminated, the reaction product was washed with acetone 3 times, subjected to drying in an oven at 90° C. for 10h, and then pulverized, the obtained yellowish powder was exactly the filtrate reducer A4 of the present disclosure, which had a weight average molecular weight of 360,000.

Comparative Example 1

The filtrate reducer was prepared according to the method of Example 1, except that an anionic hydration-enhancing monomer (i.e., 2-acrylamido-2-methylpropane sulfonic acid) was not added, and the filtrate reducer D1 was obtained.

Comparative Example 2

The filtrate reducer was prepared according to the method of Example 1, except that a cationic adsorption monomer (i.e., dimethyl aminopropyl methacrylamide) was not added, and the filtrate reducer D2 was obtained.

Comparative Example 3

The filtrate reducer was prepared according to the method of Example 1, except that the polyether monomer PCB 7230-1800 was not added, the filtrate reducer D3 was obtained.

Comparative Example 4

The filtrate reducer was prepared according to the method of Example 1, except that a cyclic monomer (i.e., 1-vinylimidazole) was not added, the filtrate reducer D4 was obtained.

Comparative Example 5

The filtrate reducer was prepared according to the method of Example 1, except that a main chain monomer was not added, the filtrate reducer D5 was obtained.

Comparative Example 6

The filtrate reducer was prepared according to the method of Example 1, except that the hyper-branched structural monomer TME was not added, the filtrate reducer D6 was obtained.

Comparative Example 7

The filtrate reducer was prepared according to the method of Example 1, except that the hyper-branched structural monomer TME in step (4) was replaced with an equal mass of N,N,N',N'-tetramethyl ethylenediamine, the filtrate reducer D7 was obtained.

Comparative Example 8

The filtrate reducer was prepared according to the method of Example 1, except that sodium bisulfite was not added in both step (3) and step (4), the filtrate reducer D8 was obtained.

Comparative Example 9

The filtrate reducer was prepared according to the method of Example 1, except that the temperature was not raised in step (4), the reaction temperature was maintained at 65° C., and the filtrate reducer D9 was obtained.

Use Example 1

(1) Preparation of the drilling fluid F1:4 parts by weight of sodium bentonite were added to 100 parts by weight of water, stirred for 20 min, and then subjected to standing still and conserving at room temperature for 24h, further stirred for 20 min, 3 parts by weight of filtrate reducer A1 were added, stirred for 20 min, the drilling fluid F1 was obtained.
(2) Preparation of the drilling fluid F2:4 parts by weight of sodium bentonite were added to 100 parts by weight of water, stirred for 20 min, and then subjected to standing still and conserving at room temperature for 24h, further stirred for 20 min, 3 parts by weight of filtrate reducer A2 were added, stirred for 20 min, the drilling fluid F2 was obtained.
(3) Preparation of the drilling fluid F3:4 parts by weight of sodium bentonite were added to 100 parts by weight of water, stirred for 20 min, and then subjected to standing still and conserving at room temperature for 24h, further stirred for 20 min, 3 parts by weight of filtrate reducer A3 were added, stirred for 20 min, the drilling fluid F3 was obtained.
(4) Preparation of the drilling fluid F4:4 parts by weight of sodium bentonite were added to 100 parts by weight of water, stirred for 20 min, and then subjected to standing still and conserving at room temperature for 24h, further stirred for 20 min, 3 parts by weight of filtrate reducer A4 were added, stirred for 20 min, the drilling fluid F4 was obtained.

Use Comparative Example 1

(1) Preparation of the drilling fluid DF0:4 parts by weight of sodium bentonite were added to 100 parts by weight of water, stirred for 20 min, and then subjected to standing still and conserving at room temperature for 24h, further stirred for 20 min, 3 parts by weight of commercially available filtrate reducer DSP-1 were added, stirred for 20 min, the drilling fluid DF0 was obtained.

(2) Preparation of the drilling fluid DF1:4 parts by weight of sodium bentonite were added to 100 parts by weight of water, stirred for 20 min, and then subjected to standing still and conserving at room temperature for 24h, further stirred for 20 min, 3 parts by weight of filtrate reducer D1 were added, stirred for 20 min, the drilling fluid DF1 was obtained.

(3) Preparation of the drilling fluid DF2:4 parts by weight of sodium bentonite were added to 100 parts by weight of water, stirred for 20 min, and then subjected to standing still and conserving at room temperature for 24h, further stirred for 20 min, 3 parts by weight of filtrate reducer D2 were added, stirred for 20 min, the drilling fluid DF2 was obtained.

(4) Preparation of the drilling fluid DF3:4 parts by weight of sodium bentonite were added to 100 parts by weight of water, stirred for 20 min, and then subjected to standing still and conserving at room temperature for 24h, further stirred for 20 min, 3 parts by weight of filtrate reducer D3 were added, stirred for 20 min, the drilling fluid DF3 was obtained.

(5) Preparation of the drilling fluid DF4:4 parts by weight of sodium bentonite were added to 100 parts by weight of water, stirred for 20 min, and then subjected to standing still and conserving at room temperature for 24h, further stirred for 20 min, 3 parts by weight of filtrate reducer D4 were added, stirred for 20 min, the drilling fluid DF4 was obtained.

(6) Preparation of the drilling fluid DF5:4 parts by weight of sodium bentonite were added to 100 parts by weight of water, stirred for 20 min, and then subjected to standing still and conserving at room temperature for 24h, further stirred for 20 min, 3 parts by weight of filtrate reducer D5 were added, stirred for 20 min, the drilling fluid DF5 was obtained.

(7) Preparation of the drilling fluid DF6:4 parts by weight of sodium bentonite were added to 100 parts by weight of water, stirred for 20 min, and then subjected to standing still and conserving at room temperature for 24h, further stirred for 20 min, 3 parts by weight of filtrate reducer D6 were added, stirred for 20 min, the drilling fluid DF6 was obtained.

(8) Preparation of the drilling fluid DF7:4 parts by weight of sodium bentonite were added to 100 parts by weight of water, stirred for 20 min, and then subjected to standing still and conserving at room temperature for 24h, further stirred for 20 min, 3 parts by weight of filtrate reducer D7 were added, stirred for 20 min, the drilling fluid DF7 was obtained.

(9) Preparation of the drilling fluid DF8:4 parts by weight of sodium bentonite were added to 100 parts by weight of water, stirred for 20 min, and then subjected to standing still and conserving at room temperature for 24h, further stirred for 20 min, 3 parts by weight of filtrate reducer D8 were added, stirred for 20 min, the drilling fluid DF8 was obtained.

(10) Preparation of the drilling fluid DF9:4 parts by weight of sodium bentonite were added to 100 parts by weight of water, stirred for 20 min, and then subjected to standing still and conserving at room temperature for 24h, further stirred for 20 min, 3 parts by weight of filtrate reducer D9 were added, stirred for 20 min, the drilling fluid DF9 was obtained. Use Example 2

(1) Preparation of the drilling fluid T1:4 parts by weight of sodium bentonite were added to 100 parts by weight of water, stirred for 20 min, and then subjected to standing still and conserving at room temperature for 24h, further stirred for 20 min, 3 parts by weight of filtrate reducer A1, 3 parts by weight of the sulfonated asphalt FF-1, and 3 parts by weight of the lubricant RH-3 were added, stirred for 20 min, the drilling fluid T1 was obtained.

(2) Preparation of the drilling fluid T2:4 parts by weight of sodium bentonite were added to 100 parts by weight of water, stirred for 20 min, and then subjected to standing still and conserving at room temperature for 24h, further stirred for 20 min, 3 parts by weight of filtrate reducer A1, 2 parts by weight of sulfomethyl phenolic resin SMP-2, 2 parts by weight of sulfonated lignite SMC, and 1 part by weight of sulfonated lignite phenolic resin SPNH were added, stirred for 20 min, the drilling fluid T2 was obtained.

(3) Preparation of the drilling fluid T3:4 parts by weight of sodium bentonite were added to 100 parts by weight of water, stirred for 20 min, and then subjected to standing still and conserving at room temperature for 24h, further stirred for 20 min, 3 parts by weight of filtrate reducer A1, 3 parts by weight of plugging agent NP-1, and 2 parts by weight of amino polyol AP-1 were added, stirred for 20 min, the drilling fluid T3 was obtained.

(4) Preparation of the drilling fluid T4:4 parts by weight of sodium bentonite were added to 100 parts by weight of water, stirred for 20 min, and then subjected to standing still and conserving at room temperature for 24h, further stirred for 20 min, 3 parts by weight of filtrate reducer A1, 3 parts by weight of sulfonated asphalt FF-1, 3 parts by weight of lubricant RH-3, 3 parts by weight of plugging agent NP-1, and 2 parts by weight of amino polyol AP-1 were added, stirred for 20 min, the drilling fluid T4 was obtained.

Use Comparative Example 2

The filtrate reducer A1 used in the preparation process of drilling fluids T1-T4 in the Use Example 2 was replaced with an equivalent weight of filtrate reducer DSP-1, and the comparative drilling fluids DT1-DT4 were prepared respectively.

Test Example 1

400 mL of four groups of drilling fluids F1-F4 and DF0-DF9 were taken respectively, then stirred at 8,000 rpm for 20 min, 36 wt % NaCl, 5 wt % $CaCl_2$, 10 wt % KCl and the composite salt (15 wt % NaCl+7 wt % KCl+5 wt % $CaCl_2$)) were added respectively, further stirred for 20 min, the drilling fluids were put in a stainless steel aging tank and rolled at a constant temperature 240° C. for 16 hours. After the aging process was complete, the drilling fluids were cooled to room temperature and taken out, subsequently stirred at 8,000 rpm for 20 min. The apparent viscosity (AV, mPa·s), plastic viscosity (PV, mPa·s), dynamic shear force (YP, Pa), API filtrate loss $FL_{API}$, and high-temperature and high-pressure filtrate loss $FL_{HTHP}$ 240° C. of the drilling fluids were measured according to the petroleum and natural gas industry standard GB/T16783.1-2014 in China, namely "Petroleum and natural gas industries-Field testing of drilling fluids-Part 1: Water-based fluids", the results were shown in Tables 1-4.

TABLE 1

Performance test of drilling fluids (36 wt % NaCl)

| Drilling fluids | AV, mPa·s | PV, mPa·s | YP, Pa | FL$_{API}$, mL | FL$_{HTHP\ 240°\ C.}$, mL |
|---|---|---|---|---|---|
| F1 | 34 | 30 | 4 | 1.4 | 14.8 |
| F2 | 32.5 | 29 | 3.5 | 1.8 | 15.2 |
| F3 | 36 | 32.5 | 3.5 | 1.6 | 15.0 |
| F4 | 31 | 28 | 3 | 1.8 | 15.6 |
| DF0 | 17 | 16.5 | 0.5 | 14.8 | 89.6 |
| DF1 | 20 | 18.5 | 1.5 | 9.4 | 56.4 |
| DF2 | 29 | 26 | 3 | 6.0 | 32.5 |
| DF3 | 25 | 23 | 2 | 7.2 | 44.8 |
| DF4 | 22 | 21 | 1 | 6.8 | 46.8 |
| DF5 | 26 | 24 | 2 | 6.2 | 43.8 |
| DF6 | 30 | 27 | 3 | 5.4 | 29.6 |
| DF7 | 31 | 27 | 4 | 4.4 | 30.8 |
| DF8 | 28 | 26 | 2 | 6.2 | 36.6 |
| DF9 | 26 | 25 | 1 | 7.4 | 41.6 |

TABLE 2

Performance test of drilling fluids (5 wt % CaCl$_2$)

| Drilling fluids | AV, mPa·s | PV, mPa·s | YP, Pa | FL$_{API}$, mL | FL$_{HTHP\ 240°\ C.}$, mL |
|---|---|---|---|---|---|
| F1 | 39 | 33 | 6 | 1.6 | 16.2 |
| F2 | 37 | 31.5 | 5.5 | 1.8 | 17.4 |
| F3 | 41.5 | 34 | 6.5 | 2.0 | 18.2 |
| F4 | 36 | 31 | 5 | 1.8 | 16.6 |
| DF0 | 19 | 18 | 1 | 16.5 | 96.8 |
| DF1 | 20 | 19 | 1 | 10.2 | 63.2 |
| DF2 | 30 | 27 | 3 | 7.2 | 34.8 |
| DF3 | 28 | 26.5 | 1.5 | 7.6 | 49.8 |
| DF4 | 23 | 21 | 2 | 8.4 | 52.3 |
| DF5 | 27 | 24.5 | 2.5 | 7.8 | 51.4 |
| DF6 | 32 | 29.5 | 2.5 | 6.2 | 31.8 |
| DF7 | 35 | 32 | 3 | 5.6 | 37.2 |
| DF8 | 30 | 27 | 3 | 7.4 | 40.3 |
| DF9 | 28 | 26.5 | 1.5 | 7.8 | 47.8 |

TABLE 3

Performance test of drilling fluids (10 wt % KCl)

| Drilling fluids | AV, mPa·s | PV, mPa·s | YP, Pa | FL$_{API}$, mL | FL$_{HTHP\ 240°\ C.}$, mL |
|---|---|---|---|---|---|
| F1 | 40 | 34.5 | 5.5 | 1.2 | 14.2 |
| F2 | 36 | 32 | 4 | 1.4 | 14.4 |
| F3 | 37 | 33 | 4 | 1.6 | 15.8 |
| F4 | 33.5 | 29 | 4.5 | 1.2 | 14.6 |
| DF0 | 20 | 17.5 | 2.5 | 10.8 | 69.6 |
| DF1 | 23 | 20 | 3 | 8.6 | 45.6 |
| DF2 | 31 | 27.5 | 3.5 | 5.2 | 30.4 |
| DF3 | 28 | 25 | 3 | 6.4 | 39.2 |
| DF4 | 25 | 23 | 2 | 5.6 | 38.8 |
| DF5 | 27 | 25 | 2 | 5.2 | 37.6 |
| DF6 | 31 | 28 | 3 | 4.6 | 27.4 |
| DF7 | 34.5 | 30.5 | 4 | 4.2 | 28.6 |
| DF8 | 31 | 28.5 | 2.5 | 5.8 | 32.8 |
| DF9 | 29 | 27.5 | 1.5 | 6.8 | 36.4 |

TABLE 4

Performance test of drilling fluids (composite salt)

| Drilling fluids | AV, mPa·s | PV, mPa·s | YP, Pa | FL$_{API}$, mL | FL$_{HTHP\ 240°\ C.}$, mL |
|---|---|---|---|---|---|
| F1 | 39 | 34 | 5 | 1.4 | 16.8 |
| F2 | 35 | 30.5 | 4.5 | 1.6 | 17.2 |
| F3 | 38 | 33 | 5 | 1.8 | 17.6 |
| F4 | 32 | 28 | 4 | 1.8 | 17.4 |
| DF0 | 19 | 17 | 2 | 14.6 | 78.2 |
| DF1 | 21 | 18 | 3 | 9.2 | 47.6 |
| DF2 | 32 | 28 | 4 | 5.6 | 34.2 |
| DF3 | 27 | 24.5 | 2.5 | 6.6 | 43.4 |
| DF4 | 24 | 22 | 2 | 6.8 | 40.6 |
| DF5 | 26 | 23.5 | 2.5 | 6.2 | 38.8 |
| DF6 | 30 | 27.5 | 2.5 | 5.4 | 31.8 |
| DF7 | 35 | 31 | 4 | 4.8 | 31.2 |
| DF8 | 30 | 27 | 3 | 6.4 | 38.2 |
| DF9 | 28 | 26.5 | 1.5 | 7.4 | 39.6 |

As can be seen from the data in Tables 1-4, the filtrate reducers of the present disclosure have significantly better filtrate reduction effects. The filtrate reducers of the present disclosure may produce the desired filtrate reduction effects under the conditions including a high temperature of 240° C., 36 wt % NaCl, 5 wt % CaCl$_2$), and 10 wt % KCl, and can meet the requirements of ultra-deep stratum drilling.

Test Example 2

400 mL of four groups of drilling fluids F1-F4 were taken respectively, then stirred at 8,000 rpm for 20 min, the drilling fluids were rolled at a constant temperature of 240° C. for 1 day, 3 days, 7 days, and 10 days. After the aging process was complete, the drilling fluids were cooled to room temperature and taken out, subsequently stirred at 8,000 rpm for 20 min. The apparent viscosity (AV, mPa·s), plastic viscosity (PV, mPa·s), dynamic shear force (YP, Pa), API filtrate loss FL$_{API}$, and high-temperature and high-pressure filtrate loss FL$_{HTHP}$ 240° C. of the drilling fluids were measured according to the petroleum and natural gas industry standard GB/T16783.1-2014 in China, namely "Petroleum and natural gas industries-Field testing of drilling fluids-Part 1: Water-based fluids", the results were shown in Table 5.

TABLE 5

Performance test of drilling fluids (long-term aging)

| Drilling fluids | Aging time | AV, mPa·s | PV, mPa·s | YP, Pa | FL$_{API}$, mL | FL$_{HTHP\ 240°\ C.}$, mL |
|---|---|---|---|---|---|---|
| F1 | 1 d | 39 | 34 | 5 | 1.2 | 14.6 |
|  | 3 d | 30 | 25.5 | 4.5 | 1.8 | 17.2 |
|  | 5 d | 28 | 24 | 4 | 2.4 | 18.8 |
|  | 7 d | 26 | 23 | 3 | 2.6 | 20.4 |
|  | 10 d | 20 | 18.5 | 1.5 | 2.8 | 23.6 |
| F2 | 1 d | 35 | 31.5 | 3.5 | 1.6 | 15.2 |
|  | 3 d | 30 | 27 | 3 | 2.0 | 17.0 |
|  | 5 d | 27 | 24.5 | 2.5 | 2.8 | 19.4 |
|  | 7 d | 22 | 20 | 2 | 3.2 | 21.4 |
|  | 10 d | 17 | 15.5 | 1.5 | 3.6 | 24.8 |
| F3 | 1 d | 36 | 32 | 4 | 1.6 | 16.2 |
|  | 3 d | 30 | 26 | 4 | 1.8 | 18.0 |
|  | 5 d | 28 | 25 | 3 | 2.2 | 20.8 |
|  | 7 d | 25 | 22.5 | 2.5 | 2.6 | 22.2 |
|  | 10 d | 21 | 19 | 2 | 2.8 | 23.8 |
| F4 | 1 d | 33.5 | 29.5 | 4 | 1.6 | 15.2 |
|  | 3 d | 30 | 27 | 3 | 2.4 | 17.6 |
|  | 5 d | 28 | 25 | 3 | 2.8 | 19.2 |
|  | 7 d | 24 | 21.5 | 2.5 | 3.2 | 23.6 |
|  | 10 d | 19 | 17.5 | 1.5 | 3.8 | 24.8 |

As indicated by the data in Table 5, the viscosity of the drilling fluids fed with the filtrate reducers according to the present disclosure slightly decreases after aging for a long time, but the drilling fluids still exhibit desirable rheology performance, and retain the low filtrate loss. The high-temperature and high-pressure filtrate loss of the drilling fluids after aging for 10 days at 240° C. were all less than 25 mL, it demonstrates the superior long-term stability of the filtrate reducers according to the present disclosure, thus the drilling fluids can serve to reduce filtrate loss over a long time during the on-site use.

Test Example 3

400 mL of four groups of drilling fluids T1-T4 and DT1-DT4 were taken respectively, then stirred at 8,000 rpm for 20 min, the drilling fluids were put in a stainless steel aging tank and rolled at a constant temperature of 240° C. for 16 hours. After the aging process was complete, the drilling fluids were cooled to room temperature and taken out, subsequently stirred at 8,000 rpm for 20 min. The apparent viscosity (AV, mPa·s), plastic viscosity (PV, mPa·s), dynamic shear force (YP, Pa), API filtrate loss $FL_{API}$, and high-temperature and high-pressure filtrate loss $FL_{HTHP}$ 240° C. of the drilling fluids were measured according to the petroleum and natural gas industry standard GB/T16783.1-2014 in China, namely "Petroleum and natural gas industries-Field testing of drilling fluids-Part 1: Water-based fluids", the results were shown in Table 6.

TABLE 6

Performance test of drilling fluids

| Drilling fluids | AV, mPa·s | PV, mPa·s | YP, Pa | $FL_{API}$, mL | $FL_{HTHP\ 240°\ C.}$, mL |
|---|---|---|---|---|---|
| T1 | 42 | 36 | 6 | 0.6 | 13.2 |
| T2 | 48 | 41.5 | 6.5 | 0.2 | 13.6 |
| T3 | 38.5 | 34 | 4 | 0.4 | 13.0 |
| T4 | 45 | 39 | 6 | 0.2 | 11.2 |
| DT1 | 28.5 | 26 | 2.5 | 8.8 | 68.2 |
| DT2 | 30 | 29 | 1 | 17.6 | 97.4 |
| DT3 | 28 | 26.5 | 1.5 | 14.2 | 77.4 |
| DT4 | 29 | 26 | 3 | 7.4 | 59.4 |

As illustrated by the data in Table 6, the filtrate reducers of the present disclosure have good compatibility with the conventional and commercially available drilling fluid treating agents such as sulfonated asphalt FF-1, lubricant RH-3, and plugging agent NP-1, when the reagents are used in combination, they can produce a synergistic effect, which provides the convenience for the preparation of the drilling fluid systems, reflects the good compatibility and general applicability of the filtrate reducers. The commercially available filtrate reducer DSP-1 has inferior performance relative to the filtrate reducers of the present disclosure, it has poor compatibility with other treating agents, when the commercially available filtrate reducer DSP-1 is used in combination with other treating agents, their properties are further degraded.

Test Example 4

The effects of a filtrate reducer of the present disclosure as a fluid loss agent of the cementing fluid were tested.

The performance evaluation was implemented on the filtrate reducers A1-A4 prepared in Examples 1~4 and the commercially available high temperature resistant well cementation fluid loss agent HT-1 according to the petroleum and natural gas industry standard SY/T5504.2-2013 "Evaluation method for well cement additives-Part 2: Fluid loss additive", and the National Standard GB/T19139-2012 "Testing method of well cements" of China, the initial consistency, API fluid loss, and free fluid were measured under the test temperature of 240° C. and with an additional amount of 5 wt % in the cement paste. The results were shown in Table 7.

TABLE 7

The fluid loss reduction test of the cementing fluid

| Samples | Initial consistency, Bc | API fluid loss, mL | Free fluid, % |
|---|---|---|---|
| Filtrate reducer A1 | 30 | 24 | 0 |
| Filtrate reducer A2 | 28 | 22 | 0 |
| Filtrate reducer A3 | 31 | 26 | 0 |
| Filtrate reducer A4 | 34 | 25 | 0 |
| Commercially available fluid loss agent HT-1 | 46 | 104 | 0.7 |

As can be seen from the data in Table 7, the filtrate reducer of the present disclosure also produces desirable effects when used as a fluid loss agent of the cementing fluid, and allows the oil well cement to retain a low initial consistency under the condition of ultra-high temperature of 240° C., the API fluid loss is less than 26 mL without precipitation of free fluid, the properties are significantly better than the commercially available high temperature resistant well cementation fluid loss agent HT-1.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A filtrate reducer comprising:
   a first structural unit provided by an anionic hydration-enhancing monomer;
   a second structural unit provided by a cationic adsorption monomer;
   a third structural unit provided by a main chain monomer;
   a fourth structural unit provided by a cyclic monomer;
   a fifth structural unit provided by a polyether monomer;
   a sixth structural unit provided by a hyper-branched structural monomer;
   wherein the main chain monomer is N,N-dimethyl acrylamide and/or N,N-diethyl acrylamide, the filtrate reducer has a weight average molecular weight within the range from 200,000 to 800,000, and wherein the hyper-branched structural monomer is represented by formula (I),

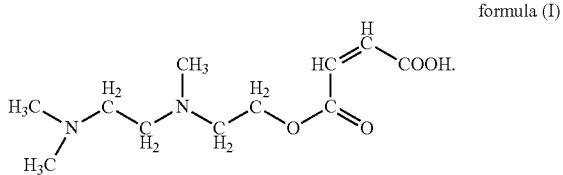 [SMILES: CN(C)CCN(C)CCOC(=O)/C=C\C(=O)O]

formula (I)

2. The filtrate reducer of claim 1, wherein the weight ratio of the first structural unit, the second structural unit, the third structural unit, the fourth structural unit, the fifth structural unit, and the sixth structural unit is (10-60):(5-40):(5-40):(2-20):(5-40): 1.

3. The filtrate reducer of claim 1, wherein the anionic hydration-enhancing monomer is at least one of 2-acrylamido-2-methylpropane sulfonic acid, sodium p-styrene sulfonate, and sodium allyl sulfonate.

4. The filtrate reducer of claim 1, wherein the cationic adsorption monomer is at least one of dimethyl aminopropyl methacrylamide, dimethyldiallyl ammonium chloride, and acryloxyethyl trimethyl ammonium chloride.

5. The filtrate reducer of claim 1, wherein the main chain monomer is a combination of N,N-dimethyl acrylamide and N,N-diethyl acrylamide, and the weight ratio of N,N-dimethyl acrylamide to N,N-diethyl acrylamide is 1:(0.1-1).

6. The filtrate reducer of claim 1, wherein the cyclic monomer is at least one of N-vinyl pyrrolidone, 1-vinylimidazole, 4-vinylpyridine, and 4-acryloyl morpholine.

7. The filtrate reducer of claim 1, wherein the polyether monomer is at least one of modified alkylene polyoxyethylene ether, hydroxybutyl polyoxyethylene ether, 4-hydroxybutyl vinyl ether polyoxyethylene ether, and ethylene glycol monovinyl polyoxyethylene ether; and the polyether monomer has a molecular weight within the range from 1,500 to 4,000.

8. A preparation method for the filtration reducer according to claim 1,
wherein the method comprises the following steps:
subjecting the anionic hydration-enhancing monomer, the cationic adsorption monomer, the main chain monomer, the cyclic monomer, and the polyether monomer to a primary reaction in the presence of a first initiator under an inert atmosphere to obtain a product;
subjecting the product obtained from the primary reaction to a secondary reaction with the hyper-branched structural monomer in the presence of a second initiator;
wherein the main chain monomer is N,N-dimethyl acrylamide and/or N,N-diethyl acrylamide.

9. The method of claim 8, wherein the dosage weight ratio of the anionic hydration-enhancing monomer, the cationic adsorption monomer, the main chain monomer, the cyclic monomer, the polyether monomer, and the hyper-branched structural monomer is (10-60):(5-40):(5-40):(2-20):(5-40): 1.

10. The method of claim 8, wherein the anionic hydration-enhancing monomer is at least one of 2-acrylamido-2-methylpropane sulfonic acid, sodium p-styrene sulfonate, and sodium allyl sulfonate.

11. The method of claim 8, wherein the cationic adsorption monomer is at least one of dimethyl aminopropyl methacrylamide, dimethyldiallyl ammonium chloride, and acryloxyethyl trimethyl ammonium chloride.

12. The method of claim 8, wherein the main chain monomer is a combination of N,N-dimethyl acrylamide and N,N-diethyl acrylamide, and the weight ratio of N,N-dimethyl acrylamide to N,N-diethyl acrylamide is 1:(0.1-1).

13. The method of claim 8, wherein the cyclic monomer is at least one of N-vinyl pyrrolidone, 1-vinylimidazole, 4-vinylpyridine, and 4-acryloyl morpholine.

14. The method of claim 8, wherein the polyether monomer is at least one of modified alkylene polyoxyethylene ether, hydroxybutyl polyoxyethylene ether, 4-hydroxybutyl vinyl ether polyoxyethylene ether, and ethylene glycol monovinyl polyoxyethylene ether; and the polyether monomer has a molecular weight within the range from 1,500 to 4,000.

15. The method of claim 8, wherein the first initiator is a combination of a persulfate salt and a reducing agent, and the weight ratio of said persulfate salt to said reducing agent is 1:(0.1-0.5); the persulfate salt is at least one of ammonium persulfate, potassium persulfate, and sodium persulfate; and the reducing agent is at least one of sodium bisulfite, ammonium bisulfite, and potassium bisulfite.

16. The method of claim 8, wherein the second initiator is a combination of azobisisobutyramidine hydrochloride and a reducing agent, and the weight ratio of said azobisisobutyramidine hydrochloride to said reducing agent is 1:(0.1-0.5); and the reducing agent is at least one of sodium bisulfite, ammonium bisulfite, and potassium bisulfite.

17. The method of claim 8, wherein the temperature of said secondary reaction is 5-25° C. higher than the temperature of said primary reaction; the temperature of said primary reaction is within the range of 65-75° C., and the temperature of said secondary reaction is within the range of 80-90° C.

18. A drilling fluid comprising the filtrate reducer of claim 1.

* * * * *